United States Patent [19]

Pruder et al.

[11] 4,080,930

[45] Mar. 28, 1978

[54] BIVALVE MOLLUSCS REARING PROCESS

[75] Inventors: Gary David Pruder, Lewes; Earl Elwood Greenhaugh, Rehoboth, both of Del.

[73] Assignee: University of Delaware, Newark, Del.

[21] Appl. No.: 762,293

[22] Filed: Jan. 25, 1977

[51] Int. Cl.$^2$ ............................................. A01K 61/00
[52] U.S. Cl. ......................................................... 119/4
[58] Field of Search .................................... 119/4, 3, 2

[56] References Cited

U.S. PATENT DOCUMENTS

| | | | |
|---|---|---|---|
| 3,418,138 | 12/1968 | Dennis et al. | 119/4 |
| 3,763,824 | 10/1973 | Schoon | 119/4 |
| 3,870,020 | 3/1975 | Hunt | 119/4 |

*Primary Examiner*—Hugh R. Chamblee

[57] ABSTRACT

A method for rearing commercially desirable bivalve molluscs such as oysters, clams, mussels, and scallops under artificial conditions to any marketable size in substantially reduced time periods. Oyster spat (<0.5mm) produced by known means are placed in growing tanks and fed at certain regular times with certain species of algae in unusually large quantities, at unusually high algal cell concentrations, and maintained at unusually high temperatures until oysters reach the desired size. The tanks and oysters are meticulously cleansed and seawater or other source of salts and minerals is added at regular times during the rearing period.

8 Claims, No Drawings

BIVALVE MOLLUSCS REARING PROCESS

The Government of the United States has rights in this invention pursuant to Grant No. 04-3-158-30 awarded by the Department of Commerce.

FIELD OF THE INVENTION

This invention relates to the rearing of commercially desirable bivalve molluscs in an artificial environment. More specifically, this invention relates to the culture of *Crassostrea virginica* (Gmelin), the Eastern oyster, in a controlled environment maricultural system. It is related to a factory process in which culture conditions can be controlled at optimum levels.

DESCRIPTION OF THE PRIOR ART

It is believed that this is the first successful process in rearing oysters from egg to marketable size solely on a diet of laboratory cultured algae in 12 months or less in a controlled environment system.

The following literature indicates the state of the art and is discussed more fully below:

American Cyanamid Co. 1968. New engineering approaches for the production of Connecticut oyster. I. Problem analysis. Stamford, Connecticut. 140 pp.

Butler, P.A. 1953. Oyster growth is affected by latitudinal temperature gradients. Comm. Fish. Rev., 15(6): 7–12.

Dean, D., The Experimental Feeding of Oyster, Ph.D. Thesis, Rutgers University (1957).

Dupuy, J. L., and S. Rivkin. 1972. The development of laboratory techniques for the production of cultch-free spat of the oysters, *Crassostrea virginica*. Chesapeake Science 13 (1): 42–52.

Epifanio, C., and C. Mootz. 1975a. Growth of oysters in a recirculating mariculture system. Proc. Nat. Shellfish Association Publication No. 102, College of Marine Studies, University of Delaware. 43 pp.

Epifanio, C., R. Srna, and G. Pruder. 1975b. Mariculture of shellfish in controlled environments: a prognosis. Aquaculture, 5.

Galtsoff, P.S. 1964. The American Oyster. Fish. Bull., U.S. 64: 1–480.

Loosanoff, V. and Engle, J. B. 1947. Effect of different concentrations of microorganisms on the feeding of oysters. Bull. U.S. Fish Wildl. Serv., 51: 31–57.

Mattheissen, G. and R. Toner. 1966. Possible methods of improving the shellfish industry of Martha's Vineyard, Duke's County, Mass. Marine Research Foundation publication. 138 pp.

Maurer, D. and G. Aprill. 1973. Feasibility study of raft culture of oysters in the Delaware Bay area. Report to the Delaware River Basin Commission.

Sakuda, H. M., Condition of American Oyster, *Crassostrea virginica*, in West Loch, Pearl Harbor, Hawaii, Trans. Am. Fisheries Soc., 95, 4 (1966).

*Crassostrea virginica* (Gmelin), the Eastern oyster, grows in natural waters along the Eastern and Gulf coasts. Butler (1953) reported that the period necessary for oysters to reach market size (>76mm) ranges from 30 months in Florida to 84 months in Canada. More recently, Sakuda (1966) reported that *Crassostrea virginica* grown under natural conditions in West Loch, Pearl Harbor, Hawaii, reach market size in 12 months or less.

American Cyanamid Company (1968) envisioned the revitalization of the Connecticut oyster industry by a factory process in which culture conditions could be controlled at optimum levels. Their study revealed that the essential requirements of oysters beyond the spat stage were inadequately defined and little useful data on food and other requirements had been published. Epifanio, et. al. (1975) reaffirmed these revelations in an attempt to define biological specifications for the design of highly controlled cultural systems for oysters and hard clams. Significant disagreements between researchers are common regarding food and feeding methods, water quality, and temperature as related to the growth rate of oysters.

Matthiessen and Toner (1966) calculated that adult oysters growing near Martha's Vineyard, Mass., could not possibly eat more that $1.1 \times 10^9$ algal cells/animal/day; they calculated this on the basis of algal concentrations in the natural water and values taken from the literature for pumping rates on the animal (10L water/oyster/hour). However, in the same publication they reported that oysters being conditioned to spawn are fed at a rate of $10 \times 10^9$ cells/oyster/day of a mixture of *Skeletonema costatum* and either *Monochrysis lutheri* or *Isochrysis galbana*. Dean (1957) reported feeding a mixture of Cryptomonas sp and Chlamydomonas sp to adult oysters at a rate of $2.4 \times 10^8$ cells/oyster/day. American Cyanamid (1968) considered these data and selected a range over which the quantity of food required by oysters might reasonably vary; $2.4 \times 10^8$ to $2.7 \times 10^9$ algal cells/adult oyster/day.

Loosanoff and Engle (1947) reported excessive concentrations of microorganisms (Chlorella sp., Nitzschia closterium, *Provocentum triangulatum*, and *Euglena viridis*) adversely affects the feeding of oysters. When food is too abundant little or none is ingested by the oysters, i.e., *Nitzschia closterium* at a concentration of $7.5 \times 10^4$ cells/ml. Dean (1957) reported that excess food greater than $7.5 \times 10^4$ cells/ml of Cryptomonas sp. and Chlamydomonas sp., is not ingested but eliminated in the form of rejecta or pseudofeces. Galtsoff (1964) states "conditions are ideal for feeding oysters when water free of pollution and containing a low concentration of small diatoms and dinoglagellates runs over the bottom in a nonturbulent flow." These data indicate high algal concentrations are to be avoided and it is inferred that continuous feeding by the oysters at an algal concentration of below $7.5 \times 10^4$ cells/ml is desirable.

There is no general agreement as to which species of algae are essential or are the best food for oysters larger than juveniles. American Cyanamid (1968) discussed the quality of algal food in terms of oyster growth characteristics and provided the following listing, in terms of decreasing benefit.

| Oyster Size | Food (Algae) |
| --- | --- |
| Larvae | *Monochrysis lutheri* & *Isochrysis galbana* & *Cyclotella nana* (*Thalassiosira pseudonana-3H*) |
| | *Monochrysis lutheri* & *Isochrysis galbana* & *Chlorococcum sp.* |
| | *Monochrysis lutheri* & *Isochrysis galbana* |
| Juveniles | *Rhodomonas sp.* |
| | *Skeletonema costatum* |
| | *Cryptomonas sp.* |
| Larger oysters | *Cryptomonas sp.* & *Chlamydomonas sp.* |
| | *Skeletonema costatum* |
| | *Carteria sp.* |

American Cyanamid Company (1968) reviewed the literature and concluded that larvae, juveniles, and adult oysters require different temperatures for optimum growth.

| Oyster Size | Optimum Temperature (Growth) |
|---|---|
| larvae | 26–28° C |
| juveniles | 23–24° C |
| larger oysters | 19–22° C |

However, as pointed out by Epifanio (1975b) no studies are known of the effect of temperature on the growth of oysters where the quality and quantity of food have been controlled. Cyanamid (1968) suggested that 10° C may be the optimum temperature for provided oyster meats always pump and of the desired flavor. This low temperature prevents the occurrence of normal sex processes in oysters, i.e., gametogenesis and spawning.

Process methods based upon nominal values extracted from the literature have been shown to support the growth of *Crassostrea virginica*. The highest growth rate using these methods was achieved on a four-part diet of *Phaeodactylum tricornatum*, *Isochrysis galbana*, *Carteria chuii*, and *Croomonas salina* (Epifanio 1975a). These 46-week data when extrapolated, indicate a post-set to market-size period of 29 months. This period was shorter than the 36 to 60 month period for wild oysters to reach market size in Delaware Bay (Maurer-April, 1973). American Cyanamid (1968) selected the fastest growth rate data for the oyster *Crassostrea virginica* reported from hatchery and raft experiments by Mattheissen and Toner (1966), eliminated zero growth periods (hibernation), and constructed a growth curve representing what might be expected in a maricultural factory situation.

Nevertheless, there still exists a great need for an improved process for rapidly producing seed molluscs, especially oysters.

It is therefore an object of this invention to provide a process for growing commercially desirable bivalent molluscs especially seed and adult oysters from the spat stage at a markedly increased rate. It is another object to provide a process for growing commercially desirable bivalent molluscs especially oysters rapidly to a size that can be used efficiently, in a recirculatory mariculture system.

It is still another object to provide a process for rapidly growing seed oysters for planting in natural oyster beds in estuarine waters.

DETAILS OF THE INVENTION

It has been found that if the following specifications are maintained and the procedures are followed, oysters can be reared under artificial conditions to any marketable size in substantially reduced time periods (less than 12 months).

SPECIFICATIONS

| | |
|---|---|
| Oyster food, cultured algae (for all size oysters) | *Thalassiosira pseudonana-3H*, a marine diatom, and *Isochrysis galbana*, a naked flagellate. |
| Algae mix | *Thalassiosira pseudonana-3H* 50%–90% by cell count. *Isochrysis galbana* 50%–10% by cell count. |
| Algae quantity | $y = 8.2 (x)^{-0.21}$ where y = number of cells cleared by $10^8$/day/g oyster weight including shell and x = oyster weight including shell in grams |
| Feeding concentration (algae) | $0.2 - 1.0 \times 10^6$ cells/ml |
| Temperature | 25–32° C |

SPECIFICATIONS-continued

| | |
|---|---|
| Dissolved Oxygen | >3 mg/L, saturation |
| $NH_4^+$—N | <40 ug at /L |
| $p^H$ | 7.0 – 8.5 |
| Total Alkalinity | >1.6 |
| Salinity | 10–35°/oo |
| Circulation | Sufficient to keep algae in suspension |
| Oyster to tank volume | As required |

PROCEDURES

1. Oyster spat, <0.5mm height, produced by any of several known methods are placed in growing tanks. Such as those described by Dupry & Rivkin (1972).

2. The tank is filled to approximately the ⅔ level with a media providing the necessary salts and minerals (i.e. seawater 10–35°/oo salinity).

3. Unialgal cultures of *Thalassiosira pseudonana-3H* and *Isochrysis galbana* are blended and added to the growing tank in sufficient quantity to establish an algal concentration in the media of approximately $1 \times 10^6$ cells/ml.

4. The media in the tank is circulated to maintain the algal cells in suspension and passing through the oyster population.

5. The oysters feed and remove algal cells from the media. When this activity reduces the algal concentration in the media to approximately $2 \times 10^5$ cells/ml, additional blended algal culture is added to the tank to reestablish an algal concentration of $1 \times 10^6$ cells/ml. This step is repeated as often as necessary, generally two to three times per day.

6. At a convenient time near the close of an ordinary work day sufficient algae is added to the growing tank to establish the $1 \times 10^6$ cells/ml concentration. No further algal food is added until the beginning of the next working day. During the intervening period the oysters will have removed essentially all the algal cells from the media.

7. At the beginning of the following day the oysters are removed from the tank and are carefully but thoroughly washed with freshwater and returned to the growing tank. Sufficient quantity of media is drained from the tank to provide room for the algal food ration of the day.

8. Every other day after the oysters are removed, the tank is drained and the tank, pipes, pumps, and areation equipment scrubbed with hot fresh water. Then the tanks are refilled with fresh media leaving room for the food ration of the day. Procedures 2–8 are repeated 7 days per week until the oysters reach the desired size. When this occurs the oysters are moved to a second tank which is similar to the first but operated at a temperature 10°–15° C lower than the growing tank. Oysters are maintained in this conditioning tank for approximately 30 days to resorb gonadal material. Starch or yeast may be added along with the algae to fatten the oysters.

If difficulties occur in maintaining the parameters within specifications, corrective action must be taken. Most problems will be caused by attempting to carry too many oysters in a given tank.

The desirability of rearing bivalve molluscs under optimum conditions in a controlled environment factory type process has been established in the prior art. However, the prior art errors in its establishment of optimum conditions related to the quality and quantity of food, feeding methods, and temperature. Accordingly, there is emphasized below the various novel features of this invention.

A mixed diet of *Thalassiosira pseudonana-3H*, a marine diatom and *Isochrysis galbana*, a naked flagellate, will support the rapid growth of *Crassostrea virginica*, the Eastern oyster, through all stages, i.e., larval, spat, juvenile, adult, if the algae is provided in sufficient quantity and under a proper regime. It is not necessary to use other than these two algal species.

Laboratory reared oysters require a very large number of algal cells of these species to maintain rapid growth at high temperatures. It has been established $y = 8.2(x)^{-0.21}$ as the applicable relationship between the number of algal cells $\times 10^8$ cleared per day per gram total/oyster weight ($y$) and the total weight of an individual oyster, grams ($x$).

Very high algal concentrations $2 \times 10^5 - 1 \times 10^6$ cells/ml are useful in this process. No significant problem with gill clogging or excessive production of pseudofeces occurs. However, it is believed important that the oysters are exposed to media with low algal concentration for certain periods. Continuous exposure to very high algal concentration does not work as well.

High temperature will accelerate the growth of oysters providing a good diet (quality and quantity) is provided.

The oysters must be washed thoroughly with fresh water on a regular basis and the tanks and pipes must be flushed regularly.

Essentially the same conditions and procedures will support the growth of mussels, scallops, and clams under artificial conditions to any marketable size in substantially reduced time periods.

It is apparent that changes and modifications may be made herein without departing from the invention in its broadest aspects. This aim of the appended claims therefore is to cover all such changes and modifications as fall within the true spirit and scope in the invention.

We claim:

1. In a process of growing commercially desirable bivalve molluscs in an aqueous medium containing algae in an amount of at least $2 \times 10^5$ cells/ml, the improvement which comprises maintaining said aqueous medium at a temperature within the range of 25° to 32° C while periodically adding algae to a concentration of $1 \times 10^6$ cells/ml.

2. The process of claim 1 wherein periodically the algae is allowed to drop below at least $2 \times 10^5$ cells/ml by discontinuing the addition of algae.

3. The process of claim 2 wherein the period of discontinuing the addition of algae is sufficient to allow the oysters to consume substantially all the algal cells.

4. The process of claim 2 wherein the oysters are periodically removed from the aqueous medium, washed in fresh water, and placed in fresh aqueous medium to which algae is added.

5. The process of claim 1 wherein the algae is a mixture of 50 to 90% by cell count of *Thalassiosira pseudonana-3H* and 50 to 10% by cell count of *Isochrysis galbana*.

6. The process of claim 1 wherein the aqueous medium has an $NH_4^+$ concentration less than 40 ug at/L.

7. The process of claim 1 wherein the aqueous medium has a total alkalinity greater than 1.6, a salinity of 10 – 35°/00, and a dissolved oxygen concentration greater than 3 mg per liter but less than saturation.

8. The process of claim 1 wherein starch or yeast is added to the aqueous medium.

* * * * *